United States Patent [19]

Hotier

[11] Patent Number: 5,762,806
[45] Date of Patent: Jun. 9, 1998

[54] PROCESS FOR SIMULATED MOVING BED SEPARATION WITH A CONSTANT RECYCLE RATE

[75] Inventor: Gérard Hotier, Rueil Malmaison, France

[73] Assignee: Institut Francais du Petrole and Separex

[21] Appl. No.: 789,412

[22] Filed: Jan. 29, 1997

Related U.S. Application Data

[63] Continuation of Ser. No. 430,474, Apr. 28, 1995, abandoned.

[30] Foreign Application Priority Data

Apr. 28, 1994 [FR] France ................................. 94 05293

[51] Int. Cl.[6] ................................................. B10D 15/08
[52] U.S. Cl. ................................ 210/659; 210/198.2
[58] Field of Search ........................ 210/635, 656, 210/659, 672, 198.2; 127/46.1, 46.2; 208/310 R

[56] References Cited

U.S. PATENT DOCUMENTS

| | | | |
|---|---|---|---|
| 2,985,589 | 5/1961 | Broughton | 210/659 |
| 3,268,605 | 8/1966 | Boyd | 260/666 |
| 4,447,329 | 5/1984 | Broughton | 210/673 |
| 4,498,991 | 2/1985 | Oroskar | 210/659 |
| 5,093,004 | 3/1992 | Hotier | 210/659 |
| 5,102,553 | 4/1992 | Kearney | 210/659 |
| 5,114,590 | 5/1992 | Hotier | 210/659 |
| 5,422,007 | 6/1995 | Nicoud | 210/659 |

FOREIGN PATENT DOCUMENTS

| | | | |
|---|---|---|---|
| 0 577 079 | 1/1994 | European Pat. Off. | 210/198.2 |
| WO 93/22022 | 11/1993 | WIPO | 210/198.2 |

*Primary Examiner*—Ernest G. Therkorn
*Attorney, Agent, or Firm*—Millen, White, Zelano, & Branigan, P.C.

[57] ABSTRACT

A chromatographic simulated moving bed separation process is most generally characterized by a recycling pump which successively adopts the flow rate characteristics of 4 or 5 zones of the process. The invention describes the method by which a conventional simulated moving bed separator process can be adapted to a simulated moving bed process in which the recycling pump is operated at an optimal constant flow rate. In order to achieve this, throughout the cycle all the introduction and extraction circuits are shifted using independent means, such that the eluted volume at the outlet to each zone remains substantially constant, zone by zone, between two successive shifts throughout the cycle.

11 Claims, No Drawings

PROCESS FOR SIMULATED MOVING BED SEPARATION WITH A CONSTANT RECYCLE RATE

This application is a continuation of application Ser. No. 08/430,474, filed Apr. 28, 1995, now abandoned.
separation process with a substantially constant recycle flow rate.

It is particularly applicable to all chromatographic separation processes which employ a conventional simulated moving bed and it constitutes a new generation thereof. Examples are the separation of xylenes, separation of normal and isoparaffins, separation of sugars (glucose, fructose) and more recent applications such as separation of optical isomers or amino acids.

BACKGROUND OF THE INVENTION

The prior art is, for example, illustrated in U.S. Pat. Nos. 2,985,589 and 4,498,991 which constitute the standard texts respectively for simulated counter-current and simulated co-current modes. It is explicitly stated therein that each inlet and outlet stream shifts simultaneously and periodically with all the others. In U.S. Pat. No. 5,114,590, again each stream is simultaneously shifted with the others, period by period, except for one in particular which takes two different positions during the shift period T. The prior art thus teaches a unique period T between two successive shifts for each stream, the product of this period and the number of column sections n or independent beds, n.T constituting the cycle time.

Such a conventional simulated moving bed separation process is basically operated with either 4 or 5 different flow rates at the recycling pump; these flow rates correspond to the flow rates in the four or five zones in the process. In industry, for practical reasons involving purges of lines carrying different streams, processes are also known which operate with six or even seven different flow rates at this pump. A number of problems arise from the fact that during each cycle, the recycling pump changes flow rates as frequently as there are zones in the process:

- The pump must be tailored to the highest flow rate: it is thus too strong for the others.
- At each flow rate change, the pressure profile in the columns undergoes a sudden and unavoidable variation which among others, disturbs the flow rate of the pressure controlled output stream (raffinate).
- At each change, the passage from one flow rate to the next is not instantaneous: in an industrial unit, for example, 2 seconds for passage from one flow rate to another indicates good regulation: thus for about 10 seconds in a cycle lasting on the order of 2000 seconds, the flow rate is poorly defined.
- The flow rate in each zone must be constantly monitored to ensure it is constant whatever the position of the zones with respect to the recycling pump. Taking the imperfections in measuring and regulating flow rates of the recycle, inlet and outlet streams into account, it is difficult to achieve a flow rate fluctuation of less than 2%.

Prior art document WO 93/22022 describes a simulated mobile bed system with a constant recycle flow rate: the recycling pump is displaced in the same way as the inlet and outlet points and thus the latter is always located in the same zone and hence its flow rate remains constant. However, this system requires that each section of the simulated mobile bed is in a separate column and, in addition to its connections to the introduction and extraction circuits and with the preceding and following sections, each section is connected to the intake and to the output of the recycling pump and is isolatable, thus of course rendering the system far more expensive.

The prior art is also illustrated by the patents EP-A-0577079 and U.S. Pat. No. 3268605.

SUMMARY OF THE INVENTION

The object of the invention is to provide a simulated mobile bed separation process with a substantially constant recycle flow rate, which overcomes the problems described above without the need for a pump which is periodically displaced with the injection and extraction points.

More generally, the invention concerns a simulated mobile bed separation process for a feed comprising at least 2 constituents in the presence of at least one solvent, in an apparatus containing n chromatographic column sections defining at least 4 zones and at most z zones, comprising a recycling pump for a mixture of solvent and constituents located between sections n and 1 and being in each zone successively during the course of one cycle, the apparatus containing n column sections including z.n introduction and extraction points, such that during a cycle, each of z introduction and extraction circuits is successively connected to each of the n introduction or extraction points corresponding thereto, the process being characterised in that the recycling pump circulates said mixture at a recycle flow rate $Q_c$ which is substantially constant during the cycle, said flow rate $Q_c$ being greater than the highest of the z inlet-outlet flow rates injected or extracted to/from the apparatus, and in that all the introduction and extraction circuits are shifted throughout the cycle using independent means, such that the eluted volume at the outlet to each zone is substantially constant, zone by zone, between two successive shifts throughout the cycle.

The term "independent means" means either n.z on-off valves controlling the inflow or outflow of fluids to or from the circuit, or z valves in n positions controlling the inflow or outflow to or from the circuit, said valves being connected to a control center.

We have used a numbering system for the sections such that the recycling pump is between sections n and 1. This numbering is, of course, arbitrary. Any other convention could be adopted.

In a first embodiment, when very high purity is required, all the streams can be shifted at different instants. More precisely, each circuit can be shifted in its own time sequence, after a time interval $(T_{i+1}{}^j - T_i{}^{j-1})$, which is defined by the relation:

$$0.975 T.Qk < (T_{i+1}{}^j - T_i{}^{j-1}).Q_k{}^p < 1.025\ T.Qk$$

where j is the number of the section immediately preceding the introduction or extraction point; i is the number of times which the slowest extraction or introduction circuit has already shifted since the beginning of the cycle, T, $Q_k$ and $Q_k{}^p$ respectively represent the constant time interval of the equivalent conventional simulated mobile bed, the constant flow rate in zone k of the equivalent conventional simulated mobile bed and the flow rate in zone k of the constant recycle simulated mobile bed when the pump is in zone p.

Preferably, each circuit is shifted in a time interval defined by the relation:

$$0.9975 T.Qk < (T_{i+1}{}^j - T_i{}^{j-1}).Q_k{}^p < 1.0025\ T.Q_k$$

Under these conditions, the products can be separated with a purity approaching 100%.

In a second embodiment of the process which corresponds to obtaining less pure products, all the introduction and extraction circuits are simultaneously shifted throughout the cycle, at time intervals of $(T_{i+1}-T_i)$, where i, which is between 0 and n−1, represents the number of times which the ensemble of introduction and extraction points has already been shifted since the beginning of the cycle, $(T_{i+1}-T_i)$ being defined by the following relation:

$$0.975T\ Q_M < (T_{i+1}-T_i) \cdot Q_{Mk} < 1.025\ T \cdot Q_M$$

where T, $Q_M$ and $Q_{Mk}$ respectively represent the constant time interval of the equivalent conventional simulated mobile bed, the weighted average flow rate in the separation zones of the equivalent conventional simulated mobile bed, and the weighted average flow rate in the separation zones of the constant recycle simulated mobile bed when the pump is in zone k.

Advantageously, the simultaneous shifting throughout the cycle of all the introduction and extraction circuits effected at time intervals defined by the relation:

$$0.9975\ T \cdot Q_M < (T_{i+1}-T_i) \cdot Q_{Mk} < 1.0025\ T \cdot Q_M$$

substantially improves the purity of the separated products using this particular embodiment.

The process described can be operated in counter-current or in co-current mode in which the circuits are respectively advanced in the same sense or in the opposite sense to the flow of the liquid streams (U.S. Pat. No. 2,985,589, U.S. Pat. No. 4,498,991, for example).

Operating the recycling pump at a substantially constant flow rate automatically removes the difficulties of the prior art:

The pump is tailored to a single flow rate, preferably lower than the highest of the flow rates described above.

The pressure profiles are no longer perturbed when the configuration is changed.

Since the flow rate remains substantially constant, it is of little importance that regulation of the flow rate is only slow.

The flow rates in each zone do not remain constant during a cycle but it is sufficient that the differences between these flow rates (which represent the inlet and outlet flow rates) do remain constant for the internal consistency of the system to be strictly ensured.

In operating the system, there are a certain number of constraints:

The total cycle time is the same for each stream: each inflow and outflow stream must traverse the whole of the circuit in the same time as the others. As a corollary, each section is in an identical position with respect to the streams at the end of the same period, namely the cycle time.

In the first embodiment described above, each stream must be controlled independently from the others; either using one on-off valve per section and per stream (total n.z valves) or using a valve with n positions per stream, i.e., a total of z valves.

If in the first embodiment the connection points of one particular stream sometimes displace faster than those of the following stream (in the direction of flow), the number of sections contained in this zone in the initial configuration must be at least 2, otherwise the two streams will be found between the two same sections at particular instants during the cycle. More precisely, the system comprises at least 2z-2 distinct sections in the whole of the system.

In the general case of a conventional simulated mobile bed (SMB) with 4 zones comprising Ci sections in each of the four zones (i=1 to 4), the weighted average recirculation flow rate $Q_M$ is defined as:

$$Q_M = \frac{C_1(Q_4+S) + C_2(Q_4+S-E) + C_3(Q_4+R) + C_4 Q_4}{n}$$

where $$n = \sum_{i=1}^{4} C_i,$$

where $Q_4$ is the flow rate in zone 4, and S, E, and R are respectively the flow rates of solvent, extract and raffinate.

As a first approximation, the conventional simulated mobile bed can be transposed to a constant recycle simulated mobile bed using the following rule:

The eluted volume at the outlet to each zone remains substantially constant:

$$Q_k \cdot T = Q_k^P \cdot (T_{i+1}^j - T_i^{j-1}) \qquad (1)$$

where $Q_k$ represents the flow rate in zone k in the conventional simulated mobile bed ($Q_1$, $Q_2$, $Q_3$, $Q_4$ for a simulated mobile bed with 4 zones), T represents the shift period for the conventional simulated mobile bed (a single value), $Q_k^P$ represents the flow rate in zone k in the constant recycle simulated mobile bed when the pump is in zone p, $T_{i+1}^j$ represents the instant when the introduced or extracted stream shifts from the outlet to the $j^{th}$ section to the outlet to the following section, where:

j is the number of the section immediately preceding the introduction or extraction point;

i is the number of times the slowest of the z circuits has already shifted since the beginning of the cycle.

$[Q_k^P]$ and $[T_{i+1}^j]$ are square matrices of dimension n×n, where n represents the number of sections in the process. These matrices comprise:

for the first, at least $z^2$ different terms, for the second, at least n×z different terms.

The rule embodied in equation (1) must be examined to determine its validity conditions:

In no way does it predict the form of the adsorption isotherms: in any conventional simulated mobile bed, the volume leaving each zone, $Q_k$xT, remains substantially constant throughout the cycle.

To be strictly true, it implies that the mass transfer does not depend on the linear velocity over the range of flow rates applied. If the Van Demeter curve (HEPT=f (VSL)) is very steep over this range, corrections must be introduced which are within the scope of the skilled person.

Let us now closely examine the series of equations which are derived from equation (1) for a conventional simulated mobile bed and for a constant recycle simulated mobile bed each including 4 zones of 2 sections or columns (i.e., a total of 8 columns or sections). By definition, Zone 1 is located between the solvent injection point and the extract extraction point, and in this zone the flow rate is $Q_1=Q_4+S$ for the conventional simulated mobile bed.

Zone 2 is located between the extract extraction point and the feed injection point, and in this zone the flow rate is $Q_2=Q_4+S-E$ for the conventional simulated mobile bed.

Zone 3 is located between the feed injection point and the raffinate extraction point, and in this zone the flow rate is $Q_3=Q_4+R$ for the conventional simulated mobile bed.

Zone 4 is located between the raffinate extraction point and the solvent injection point, and in this zone the flow rate is $Q_4$ for the conventional simulated mobile bed.

The constant flow rate applied at the recycling pump to the constant recycle simulated mobile bed is $Q_c$.

In Tables 1 and 2, respectively for the conventional simulated mobile bed and for the constant recycle simulated mobile bed, each box of the table shows successively the instant at which each column or section is shifted with respect to the zones and the flow rate in the column or section immediately before the shift. Each column of these tables thus corresponds to a particular section, while each row of Table 1 corresponds to a particular step in the conventional simulated mobile bed. Finally, each row in Table 2 corresponds to a series of different steps: the $p^{th}$ row, for example, presents the $p^{th}$ shift in each of the eight sections. Conventionally $T_p^j$ represents the $p^{th}$ shift of the $j^{th}$ section (numbering the sections from left to right) when the introduction and extraction points (and thus the zones) shift from left to right.

The recycle pump is located between section 8 and the extract and raffinate extraction points at the outlet to section 8. In this way, Tables 1 and 2 are valid both for simulated counter-current and for simulated co-current modes.

flow rate is the greatest of the four inlet-outlet flow rates, while the feed flow rate is the lowest:

$$Q_1 \geq Q_3 > Q_2 \geq Q_4 \begin{cases} E \geq Ch \rightarrow Q_1 \geq Q_3 \rightarrow R \leq S \\ R \geq Ch \rightarrow Q_2 \geq Q_4 \rightarrow E \leq S \end{cases}$$

In a first embodiment, we have:

$$Q_c > Q_4 \qquad (2)$$

$Q_c$ is expressed in the form $Q_c = Q_4 K$

Since $Q_1 = Q_4 + S > Q_4 + R = Q_3 > Q_4 + S - E = Q_2 > Q_4$, it follows that:

$$Q_c + S > Q_c + R > Q_c + S - E > Q_c \qquad (3)$$

Thus the sequencing order for the valves can be established by calculating $[T_j^i]$.

Firstly, it is important to know when the recycling pump changes the zone in order to establish, zone by zone, the four series of equations which will allow the different values of $T_j^i$ to be calculated as a function of $Q_4$, S, Ch, E, R, QC and T.

Since $Q_c = Q_4 + K$, $T_1^2$ and $T_1^6$, the shift times at the end of zones 1 and 3, can be compared:

$$T_1^2 = T \cdot (Q_4 + S)/(Q_c + S) \equiv T \cdot (Q_4 + S)/(Q_4 + K + S)$$

$$T_1^6 = T \cdot (Q_4 + R)/(Q_c + R) \equiv T \cdot (Q_4 + R)/(Q_4 + K + R)$$

TABLE 1

| \multicolumn{8}{c}{Conventional simulated mobile bed} |
|---|---|---|---|---|---|---|---|
| T, $Q_4$+S | T, $Q_4$+S | T, $Q_4$+S−E | T, $Q_4$+S−E | T, $Q_4$+R | T, $Q_4$+R | T, $Q_4$ | T, $Q_4$ |
| 2T, $Q_4$ | 2T, $Q_4$+S | 2T, $Q_4$+S | 2T, $Q_4$+S−E | 2T, $Q_4$+S−E | 2T, $Q_4$+R | 2T, $Q_4$+R | 2T, $Q_4$ |
| 3T, $Q_4$ | 3T, $Q_4$ | 3T, $Q_4$+S | 3T, $Q_4$+S | 3T, $Q_4$+S−E | 3T, $Q_4$+S−E | 3T, $Q_4$+R | 3T, $Q_4$+R |
| 4T, $Q_4$+R | 4T, $Q_4$ | 4T, $Q_4$ | 4T, $Q_4$+S | 4T, $Q_4$+S | 4T, $Q_4$+S−E | 4T, $Q_4$+S−E | 4T, $Q_4$+R |
| 5T, $Q_4$+R | 5T, $Q_4$+R | 5T, $Q_4$ | 5T, $Q_4$ | 5T, $Q_4$+S | 5T, $Q_4$+S | 5T, $Q_4$+S−E | 5T, $Q_4$+S−E |
| 6T, $Q_4$+S−E | 6T, $Q_4$+R | 6T, $Q_4$+R | 6T, $Q_4$ | 6T, $Q_4$ | 6T, $Q_4$+S | 6T, $Q_4$+S | 6T, $Q_4$+S−E |
| 7T, $Q_4$+S−E | 7T, $Q_4$+S−E | 7T, $Q_4$+R | 7T, $Q_4$+R | 7T, $Q_4$ | 7T, $Q_4$ | 7T, $Q_4$+S | 7T, $Q_4$+S |
| 8T, $Q_4$+S | 8T, $Q_4$+S−E | 8T, $Q_4$+S−E | 8T, $Q_4$+R | 8T, $Q_4$+R | 8T, $Q_4$ | 8T, $Q_4$ | 8T, $Q_4$+S |

TABLE 2

| \multicolumn{8}{c}{Constant recycle simulated mobile bed ($Q_c$ at the pump)} |
|---|---|---|---|---|---|---|---|
| $T_1^1$, Qc+S | $T_1^2$, Qc+S | $T_1^3$, Qc+S−E | $T_1^4$, Qc+S−E | $T_1^5$, Qc+R | $T_1^6$, Qc+R | $T_1^7$, Qc | $T_1^8$, Qc |
| $T_2^1$, Qc | $T_2^2$, Qc+S | $T_2^3$, Qc+S | $T_2^4$, Qc+S−E | $T_2^5$, Qc+S−E | $T_2^6$, Qc+R | $T_2^7$, Qc+R | $T_2^8$, Qc |
| $T_3^1$, Qc−R | $T_3^2$, Qc−R | $T_3^3$, Qc+S−R | $T_3^4$, Qc+S−R | $T_3^5$, Qc+S−E−R | $T_3^6$, Qc+S−E−R | $T_3^7$, Qc | $T_3^8$, Qc |
| $T_4^1$, Qc | $T_4^2$, Qc−R | $T_4^3$, Qc−R | $T_4^4$, Qc+S−R | $T_4^5$, Qc+S−R | $T_4^6$, Qc+S−E−R | $T_4^7$, Qc+S−E−R | $T_4^8$, Qc |
| $T_5^1$, Qc+R+E−S | $T_5^2$, Qc+R+E−S | $T_5^3$, Qc+E−S | $T_5^4$, Qc+E−S | $T_5^5$, Qc+E | $T_5^6$, Qc+E | $T_5^7$, Qc | $T_5^8$, Qc |
| $T_6^1$, Qc | $T_6^2$, Qc+R+E−S | $T_6^3$, Qc+E−S | $T_6^4$, Qc+E−S | $T_6^5$, Qc+E−S | $T_6^6$, Qc+E | $T_6^7$, Qc+E | $T_6^8$, Qc |
| $T_7^1$, Qc−E | $T_7^2$, Qc−E | $T_7^3$, Qc−S+R | $T_7^4$, Qc−S+R | $T_7^5$, Qc−S | $T_7^6$, Qc−S | $T_7^7$, Qc | $T_7^8$, Qc |
| $T_8^1$, Qc | $T_8^2$, Qc−E | $T_8^3$, Qc−E | $T_8^4$, Qc−S+R | $T_8^5$, Qc−S+R | $T_8^6$, Qc−S | $T_8^7$, Qc−S | $T_8^8$, Qc |

In a first embodiment, in simulated counter-current mode with a constant recycle flow rate, the strict solution for a bed with 4 zones is thus as follows:

Flow rates $Q_1$, $Q_2$, $Q_3$, $Q_4$ are oriented from left to right and, by convention, are attributed a positive algebraic value.

These are arranged in descending values, i.e., the solvent

-continued $$S \geq R \rightarrow SK \geq RK \rightarrow$$

$$Q_4^2 + (S + R + K)Q_4 + S(K + R) \geq Q_4^2 + (S + R + K)Q_4 + R(K + S)$$

-continued i.e., $(Q_4 + S) \cdot (Q_4 + K + R) \geq (Q_4 + R)(Q_4 + K + S) \rightarrow T_j^2 \geq T_j^6$ (4)

In the first line of the table, it is thus easy to demonstrate $T_1^2 > T_1^6 > T_1^4 > T_1^8$ More generally, whatever the location of the pump during the cycle, the valve at the outlet to zone 4 shifts first (solvent injection) followed by the valve at the outlet to zone 2 (feed injection) then the valve at the outlet to zone 3 (raffinate extraction), and finally the last valve to shift is that at the outlet to zone 1 (extract extraction). The invention can only be applied to a system with at least 6 sections (2 in zone 1, 1 in zone 2, 2 in zone 3, 1 in zone 4) otherwise the zone length in zone 1 and zone 3 is reduced to zero from time to time.

Table 3 represents a complete sequencing for a constant recycle simulated mobile bed operating in counter-current mode containing 8 columns, in the particular case when the cycle time of the conventional counter-current simulated mobile bed has been retained.

In a second embodiment, we have $Q_c < Q_4$. Table 2 shows that the only imperative constraint is $Q_c > S$, thus when $Q_4 > Q_c > S$, $Q_c + K = Q_4$ with $K < 0$, and the set of inequalities (4) becomes (4)bis:

$S \geq R \rightarrow SK \leq RK \rightarrow$ $Q_4^2 + (S + R + K)Q_4 + S(K + R) \leq Q_4^2 + (S + R + K)Q_4 + R(K + S)$ i.e., $(Q_4 + S) \cdot (Q_4 + K + R) \leq (Q_4 + R)(Q_4 + K + S) \rightarrow T_j^2 \leq T_j^6$ For the first row, it can be shown that $T_1^2 < T_1^6 < T_1^4 < T_1^8$

| T | Zone 1 | Zone 2 | Zone 3 | Zone 4 |
|---|---|---|---|---|
| $0-T_1^8$ | inlet$C_1$ outlet$C_2$ | inlet$C_3$ outlet$C_4$ | inlet$C_5$ outlet$C_6$ | inlet$C_7$ outlet$C_8$ |
| $T_1^8-T_1^4$ | inlet$C_2$ outlet$C_2$ | inlet$C_3$ outlet$C_4$ | inlet$C_5$ outlet$C_6$ | inlet$C_7$ outlet$C_1$ |
| $T_1^4-T_1^6$ | inlet$C_2$ outlet$C_2$ | inlet$C_3$ outlet$C_5$ | inlet$C_6$ outlet$C_6$ | inlet$C_7$ outlet$C_1$ |
| $T_1^6-T_1^2$ | inlet$C_2$ outlet$C_2$ | inlet$C_3$ outlet$C_5$ | inlet$C_6$ outlet$C_7$ | inlet$C_8$ outlet$C_1$ |
| $T_1^2-T_2^1$ | inlet$C_2$ outlet$C_3$ | inlet$C_4$ outlet$C_5$ | inlet$C_6$ outlet$C_7$ | inlet$C_8$ outlet$C_1$ |
| $T_2^1-T_2^5$ | inlet$C_3$ outlet$C_3$ | inlet$C_4$ outlet$C_5$ | inlet$C_6$ outlet$C_7$ | inlet$C_8$ outlet$C_2$ |
| $T_2^5-T_2^7$ | inlet$C_3$ outlet$C_3$ | inlet$C_4$ outlet$C_6$ | inlet$C_7$ outlet$C_7$ | inlet$C_8$ outlet$C_2$ |
| $T_2^7-T_2^3$ | inlet$C_3$ outlet$C_3$ | inlet$C_4$ outlet$C_6$ | inlet$C_7$ outlet$C_8$ | inlet$C_1$ outlet$C_2$ |
| $T_2^3-T_3^2$ | inlet$C_3$ outlet$C_4$ | inlet$C_5$ outlet$C_6$ | inlet$C_7$ outlet$C_8$ | inlet$C_1$ outlet$C_2$ |
| $T_3^2-T_3^6$ | inlet$C_4$ outlet$C_4$ | inlet$C_5$ outlet$C_6$ | inlet$C_7$ outlet$C_8$ | inlet$C_1$ outlet$C_3$ |
| $T_3^6-T_3^8$ | inlet$C_4$ outlet$C_4$ | inlet$C_5$ outlet$C_7$ | inlet$C_8$ outlet$C_8$ | inlet$C_1$ outlet$C_3$ |
| $T_3^8-T_3^4$ | inlet$C_4$ outlet$C_4$ | inlet$C_5$ outlet$C_7$ | inlet$C_8$ outlet$C_1$ | inlet$C_2$ outlet$C_3$ |
| $T_3^4-T_4^3$ | inlet$C_4$ outlet$C_5$ | inlet$C_6$ outlet$C_7$ | inlet$C_8$ outlet$C_1$ | inlet$C_2$ outlet$C_3$ |
| $T_4^3-T_4^7$ | inlet$C_5$ outlet$C_5$ | inlet$C_6$ outlet$C_7$ | inlet$C_8$ outlet$C_1$ | inlet$C_2$ outlet$C_4$ |
| $T_4^7-T_4^1$ | inlet$C_5$ outlet$C_5$ | inlet$C_6$ outlet$C_8$ | inlet$C_1$ outlet$C_1$ | inlet$C_2$ outlet$C_4$ |
| $T_4^1-T_4^5$ | inlet$C_5$ outlet$C_5$ | inlet$C_6$ outlet$C_8$ | inlet$C_1$ outlet$C_2$ | inlet$C_3$ outlet$C_4$ |
| $T_4^5-T_5^4$ | inlet$C_5$ outlet$C_6$ | inlet$C_7$ outlet$C_8$ | inlet$C_1$ outlet$C_2$ | inlet$C_3$ outlet$C_4$ |
| $T_5^4-T_5^8$ | inlet$C_6$ outlet$C_6$ | inlet$C_7$ outlet$C_8$ | inlet$C_1$ outlet$C_2$ | inlet$C_3$ outlet$C_5$ |
| $T_5^8-T_5^2$ | inlet$C_6$ outlet$C_6$ | inlet$C_7$ outlet$C_1$ | inlet$C_2$ outlet$C_2$ | inlet$C_3$ outlet$C_5$ |
| $T_5^2-T_5^6$ | inlet$C_6$ outlet$C_6$ | inlet$C_7$ outlet$C_1$ | inlet$C_2$ outlet$C_3$ | inlet$C_4$ outlet$C_5$ |
| $T_5^6-T_6^5$ | inlet$C_6$ outlet$C_7$ | inlet$C_8$ outlet$C_1$ | inlet$C_2$ outlet$C_3$ | inlet$C_4$ outlet$C_5$ |
| $T_6^5-T_6^1$ | inlet$C_7$ outlet$C_7$ | inlet$C_8$ outlet$C_1$ | inlet$C_2$ outlet$C_3$ | inlet$C_4$ outlet$C_6$ |
| $T_6^1-T_6^3$ | inlet$C_7$ outlet$C_7$ | inlet$C_8$ outlet$C_2$ | inlet$C_3$ outlet$C_3$ | inlet$C_4$ outlet$C_6$ |
| $T_6^3-T_6^7$ | inlet$C_7$ outlet$C_7$ | inlet$C_8$ outlet$C_2$ | inlet$C_3$ outlet$C_4$ | inlet$C_5$ outlet$C_6$ |
| $T_6^7-T_6^6$ | inlet$C_7$ outlet$C_8$ | inlet$C_1$ outlet$C_2$ | inlet$C_3$ outlet$C_4$ | inlet$C_5$ outlet$C_6$ |
| $T_6^6-T_7^2$ | inlet$C_8$ outlet$C_8$ | inlet$C_1$ outlet$C_2$ | inlet$C_3$ outlet$C_4$ | inlet$C_5$ outlet$C_7$ |
| $T_7^2-T_7^4$ | inlet$C_8$ outlet$C_8$ | inlet$C_1$ outlet$C_3$ | inlet$C_4$ outlet$C_4$ | inlet$C_5$ outlet$C_7$ |
| $T_7^4-T_7^8$ | inlet$C_8$ outlet$C_8$ | inlet$C_1$ outlet$C_3$ | inlet$C_4$ outlet$C_5$ | inlet$C_6$ outlet$C_7$ |
| $T_7^8-8T$ | inlet$C_8$ outlet$C_1$ | inlet$C_2$ outlet$C_3$ | inlet$C_4$ outlet$C_5$ | inlet$C_6$ outlet$C_7$ |

In this case, in the second embodiment, where $Q_4 > Q_c > S$, a different sequencing table can be established knowing that in this case, the valve that shifts first is that of the extract, then the raffinate, then the feed and finally the solvent.

Knowing that the recycling pump is fixed at section 8, attention must be paid to the following points:

The pump passes from zone 4 to zone 3 at $T_2^7$ and not $T_2^3$ since at this instant the raffinate outlet passes from the outlet to $C_7$ to the outlet to $C_8$.

The pump passes from zone 3 to zone 2 at $T_4^7$ and not $T_4^5$ since the feed injection passes from the inlet to $C_8$ to the inlet to $C1$ at the same instant.

The pump effectively passes from zone 2 to zone 1 at $T_6^7$.

In this particular case, the average recirculation flow rate for the conventional simulated mobile bed is $$Q_M = Q_4 + \frac{(2S - E + R)}{4} .$$

The value of $Q_c$ can be arbitrarily fixed (provided that it is greater than the solvent flow rate). However:

If $Q_c$ is substantially lower than the average flow rate $Q_M$ of the simulated mobile bed for which the operation is desired to be improved, the cycle time becomes very large, and certain $T_j^i$ will become much stronger than others, then a very large number of sections is required in certain zones in order to avoid the disappearance of these zones. In addition, since the flow rates $Q_k^p$ become very different from flow rates $Q_k$, it is no longer possible to assume that the transfer resistance remains identical to the conventional simulated mobile bed and the constant recycle simulated mobile bed.

If $Q_c$ is much greater than the average flow rate $Q_M$ of the conventional simulated mobile bed, the pressure drops in the unit will increase considerably, and the height of the equivalent theoretical plate will increase, so the length of the column must be increased if a given separation quality is to be retained.

In practice, advantageously, if the operation of an existing unit is to be improved, $Q_c$ is selected such that $Q_c$ is between $Q_4+S$ and the highest of the two values $Q_4$ or $S$, $Q_4$ being the lowest of the recycle flow rates in a conventional simulated mobile bed: in fact the recycling pump is tailored to transport a maximum flow rate $Q_1=Q_4+S$ and a minimum flow rate $Q_4$. In the case, of a new unit, there is greater freedom. In general, the quantity of fixed phase is minimized and in general, an interval of less than 20 seconds is not used for the interval between shifts otherwise reasonable precision is lost for this value (the movements of the valves controlling the introduction or extraction circuits are not instantaneous).

$Q_c$ will now be calculated so that the total cycle duration of the conventional counter-current simulated mobile bed is the same as that of the constant recycle counter-current simulated mobile bed. In this way, all the rules concerning dimensions are strictly preserved. This situation is considered to the optimal but is not obligatory.

In the case of a counter-current simulated mobile bed with four zones and eight columns, calculation of the optimal $Q_c$ value is made by putting:

$8.T = T_8^1 = T_8^3 = T_8^5 = T_8^7$ (5)

The terms $T_{i+1}^j$ and T are thus eliminated to give an explicit equation in $Q_c$ and the root which is closest to $Q_M$ is selected.

For zones 1, 2, 3 and 4, the four series of equations identifying the eluted volumes at the outlet to the zone between the 2 types of simulated mobile bed can be derived.

For the four zones, one and the same explicit equation which is fourth degree in $Q_c$ can be derived. Working on the series of equations for zone 3 or zone 4, the following formula is directly derived:

$$8T(Q_4+S-Q_c)=RT_2^7-Ch\ T_4^7+ET_6^7$$

where:

$$T_2^7=2T.(Q_4+R)/(Q_c+R)$$

$$T_4^7=(4.T.(Q_r+S-E)-RT_2^7)/(Q_c-Ch)$$

$$T_6^7=(6T.(Q_4+S)-RT_2^7+Ch\ T_4^7)/(Q_{c+E})$$

which, after elimination of $T_{i+1}{}^j$ and T, produces $$4Q_c^4-4Q_4Q_c^3-[Q_4(2S+R-E)+3R^2-2\ ChS+ES+2\ ECh]Q_c^2+[(Q_4+S)(2RCh+ECh-RE)-2RECh]Q_c+R.E.Ch(Q_4+S)=0$$

In the more general case of four zones and n columns, if, $C_k$ represents the number of columns in zone K, the formula is:

$$nT(Q_4+S-Q_c)=RT_{c4}{}^{n-1}-Ch\ T_{c4+c3}{}^{n-1}+ET_{c4+c3+c2}{}^{n-1}$$

where:

$$T_{c4}{}^{n-1}=C_4T\ (Q_4+R)/(Q_c+R)$$

$$T_{c4+c3}{}^{n-1}=[(C_4+C_3)(Q_4+S-E)\ T-RT_{c5}{}^{n-1}]/(Q_c-Ch)$$

$$T_{c4+c3+c2}{}^{n-1}=[(C_4+C_3+C_2)(Q_4+S)T-RT_{CR}{}^{n-1}+Ch\ T_{c4+c3}{}^{n-1}]/(Q_c+E)$$

i.e., expressed explicitly in $Q_c$:

$$nQ_c^4-nQ_4Q_c^3-[(Q_4+S-E)(nR-(C_1+C_2)Ch)+C_1E(Q_4+S)-C_4R(Q_4+R)+nRCh]Q_c^2+[(C_1+C_2)RCh(Q_4+S-E)-C_1E(R-Ch)(Q_4+S)]Q_c+C_1RECh\ (Q_4+S)=0$$

From this embodiment of a counter-current simulated mobile bed with four zones, it is easy to extrapolate the sequence for a simulated mobile bed with five zones: the average recycle flow rate for the conventional simulated mobile bed becomes:

$$Q_M = \frac{C_1(Q_4+S)+C_2(Q_4+S-E)+C_5(Q_4+S-E-RI)+C_3(Q_4+R)+C_4Q_4}{n}$$

The extraction flow rate is represented here by E+RI (RI being the internal reflux) and keeps all the values of the flow rates in zone 1, 2, 3 and 4 identical to the case of a simulated mobile bed with four zones.

In a specific case, if $Q_5$ is the flow rate in zone 5 which has just been located between zones 1 and 2, the sequence is as follows:

test for $$Q_1>Q_3>Q_2>Q_5>Q_4\ \text{or}\ Q_1>Q_3>Q_2>Q_4>Q_5$$

In the first case, the order of shifts will be: 1) solvent injection valve, 2) internal reflux valve, 3) feed injection valve, 4) raffinate extraction valve, 5) extract extraction valve.

In the second case, the first two operations will be reversed with respect to the sequence below.

A sequencing table equivalent to Table 3 is drawn up, also a time-flow rate table for the conventional simulated mobile bed and the constant recycle simulated mobile bed, respectively analogous to Tables 1 and 2.

5 series of equations (1 per zone) are then drawn up, giving $T_j{}^i$ as a function of $Q_4$, S, E, RI, Ch, R and T, where RI represents the internal reflux flow rate.

The five series of equations will lead to one and the same explicit equation which is fifth degree in $Q_c$ and the physical value of $Q_c$ will be close to $Q_M$. If the system with five zones is written as follows:

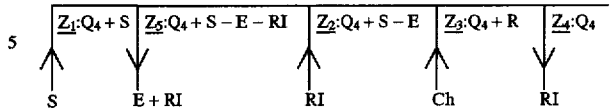

the following 5th degree equation can be derived:

$$\alpha Q_c^5+\beta Q_c^4+\gamma Q_c^3+\delta Q_c^2+\epsilon Q_c+\phi=0$$

By way of example, the value of some of the coefficients is given:

$$\alpha=n;\ B=n(Q_r+RI)$$

$$\gamma=n.(Q_4S+Ch^2-E.R+ES+RS)+(C_4+C_3+C_2).(-S-E-RI).RI-(C_4+C_3).E.Ch-(C_2+C_5).(Q_4+S).Ch-(C_5+C_1).\ Q_r.RI-C_4.R.(Q_4+R)$$

$$\phi=Ch.R\{(Q_4+S).[E.RI.(C_5+C_1)-Ch(RI.(n-C_1)+C_4+C_3)]+E.[Ch.(C_4+C_3)+RI(C_4+C_3+C_2).(E+RI)]\}$$

In an actual case, the physical root is easily found using a Newtonian method initialized by $Q_M$.

There are, of course, variations involving simulated mobile beds with six or more zones, for example:

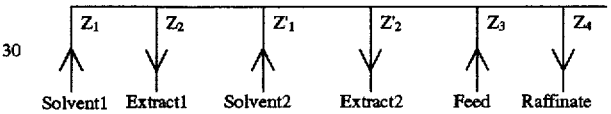

The sequence will be equivalent to that above each time. However, writing the equations corresponding to the 6th and 7th degree to arrive at an optimal solution very close to $Q_M$ would be extremely tedious. If we let $Q_c=Q_M$, a table of shift times can be calculated in which the total cycle time is slightly different to the total cycle time of the conventional simulated mobile bed.

In a second embodiment, operating in simulated co-current mode with a constant recycle flow rate, the strict solution for a bed with 4 zones is as follows:

This time, flow rates $Q_1$, $Q_2$, $Q_3$, $Q_4$ are oriented from right to left and, by convention, are attributed a negative algebraic value, while flow rates S, E, Ch and R retain a positive algebraic value; this retains the structure of the series of equations when going from simulated counter-current to simulated co-current.

This time, we have the raffinate flow rate which is the greatest of the four inlet-outlet flow rates, while the extract flow rate is the lowest:

$$Q_3 \geq Q_1 > Q_2 \geq Q_4 \begin{cases} Ch \geq E & Q_3 \geq Q_1 & S \leq R \\ R \geq Ch & Q_2 \geq Q_4 & E \leq S \end{cases}$$

In a first embodiment, we have:

$$Q_c > Q_4 \quad (2),$$

i.e., $|Q_4| \geq |Q_c|$ since, following our convention, $Q_4=-|Q_4|$ and thus $|Q_4| \geq |Q_2| \geq |Q_1| \geq |Q_3|$. From Table 2 for which all the flow rates in the zones remain oriented in the same direction, the inequality $|Q_c| \geq R$ must also be satisfied.

$Q_c$ is expressed in the form $Q_c=Q_4+K$ and it follows that $$Q_c+R>Q_c+S>Q_c+S-E>Q_c \quad (3)\text{bis}$$

Thus the sequencing order for the valves can be established by calculating [$T_i^j$]. By proceeding in a precisely analogous way to that described above in the case of simulated counter-current, taking care that in this case, the inlets and outlets to the zones are reversed, and that the eluted volumes at the outlet to each zone between the conventional simulated co-current and a simulated co-current with a constant recycle flow rate are equal. In the first row of the sequencing table, it can be demonstrated that:

$$T_1^5 > T_1^1 > T_1^3 > T_1^7$$

More generally, whatever the relative position of the pump with respect to the introduction and extraction points during the cycle, the valve at the outlet to zone 4 shifts first (raffinate extraction) followed by the valve at the outlet to zone 2 (extract extraction) then the valve at the outlet to zone 1 (solvent injection), and finally the last valve to shift is that at the outlet to zone 3 (feed injection). Once again, the invention can only be applied to a system with at least 6 sections (2 in zone 1, 1 in zone 2, 2 in zone 3, 1 in zone 4) otherwise the zone length in zone 1 and zone 3 is reduced to zero from time to time.

Table 4 represents a complete sequencing for a constant recycle simulated mobile bed operating in co-current mode containing 8 columns.

In a second embodiment, we have $Q_c < Q_4$. In this case, the set of inequalities (4) will be reversed and a reversed sequence of valves must be used.

Knowing that the recycling pump is fixed at section 8, as in the case of simulated counter-current, the moments when the recycling pump changes zone must be located: when working with $|Q_c| < |Q_4|$:

the pump passes from zone 4 to zone 3 at $T_2^8$ and not $T_2^6$

The pump passes from zone 3 to zone 2 at $T_4^8$

The pump passes from zone 2 to zone 1 at $T_6^8$ and not $T_6^2$.

point no 4 raised in the SCC case remains valid with the only difference being that the absolute value of $Q_c$ must this time be greater than the raffinate flow rate which is the highest of the inlet and outlet flow rates.

$Q_c$ will now be calculated so that the total cycle duration of the conventional co-current simulated mobile bed is the same as that of the constant recycle co-current simulated mobile bed. In this way, all the rules concerning dimensions are strictly preserved. This situation is considered to be optimal but is not obligatory.

TABLE 4

SEQUENCING OF CONSTANT CO-CURRENT RECYCLE

| T | Zone 1 | Zone 2 | Zone 3 | Zone 4 |
|---|---|---|---|---|
| $0-T_1^3$ | inlet$C_2$ outlet$C_1$ | inlet$C_4$ outlet$C_3$ | inlet$C_6$ outlet$C_5$ | inlet$C_8$ outlet$C_7$ |
| $T_1^7-T_1^3$ | inlet$C_2$ outlet$C_1$ | inlet$C_4$ outlet$C_3$ | inlet$C_7$ outlet$C_5$ | inlet$C_8$ outlet$C_8$ |
| $T_1^3-T_1^1$ | inlet$C_3$ outlet$C_1$ | inlet$C_4$ outlet$C_4$ | inlet$C_7$ outlet$C_5$ | inlet$C_8$ outlet$C_8$ |
| $T_1^1-T_1^5$ | inlet$C_3$ outlet$C_2$ | inlet$C_4$ outlet$C_4$ | inlet$C_7$ outlet$C_5$ | inlet$C_1$ outlet$C_8$ |
| $T_1^5-T_2^8$ | inlet$C_3$ outlet$C_2$ | inlet$C_5$ outlet$C_4$ | inlet$C_7$ outlet$C_6$ | inlet$C_1$ outlet$C_8$ |
| $T_2^8-T_2^4$ | inlet$C_3$ outlet$C_2$ | inlet$C_5$ outlet$C_4$ | inlet$C_8$ outlet$C_6$ | inlet$C_1$ outlet$C_1$ |
| $T_2^4-T_2^2$ | inlet$C_4$ outlet$C_2$ | inlet$C_5$ outlet$C_5$ | inlet$C_8$ outlet$C_6$ | inlet$C_1$ outlet$C_1$ |
| $T_2^2-T_2^6$ | inlet$C_4$ outlet$C_3$ | inlet$C_5$ outlet$C_5$ | inlet$C_8$ outlet$C_6$ | inlet$C_2$ outlet$C_1$ |
| $T_2^6-T_3^1$ | inlet$C_4$ outlet$C_3$ | inlet$C_6$ outlet$C_5$ | inlet$C_8$ outlet$C_7$ | inlet$C_2$ outlet$C_1$ |
| $T_3^1-T_3^5$ | inlet$C_4$ outlet$C_3$ | inlet$C_6$ outlet$C_5$ | inlet$C_1$ outlet$C_7$ | inlet$C_2$ outlet$C_2$ |
| $T_3^5-T_3^3$ | inlet$C_5$ outlet$C_3$ | inlet$C_6$ outlet$C_6$ | inlet$C_1$ outlet$C_7$ | inlet$C_2$ outlet$C_2$ |
| $T_3^3-T_3^7$ | inlet$C_5$ outlet$C_4$ | inlet$C_6$ outlet$C_6$ | inlet$C_1$ outlet$C_7$ | inlet$C_2$ outlet$C_2$ |
| $T_3^7-T_4^2$ | inlet$C_5$ outlet$C_4$ | inlet$C_7$ outlet$C_6$ | inlet$C_1$ outlet$C_8$ | inlet$C_3$ outlet$C_2$ |
| $T_4^2-T_4^6$ | inlet$C_6$ outlet$C_4$ | inlet$C_7$ outlet$C_6$ | inlet$C_2$ outlet$C_8$ | inlet$C_3$ outlet$C_3$ |
| $T_4^6-T_4^4$ | inlet$C_6$ outlet$C_4$ | inlet$C_7$ outlet$C_7$ | inlet$C_2$ outlet$C_8$ | inlet$C_3$ outlet$C_3$ |
| $T_4^4-T_4^8$ | inlet$C_6$ outlet$C_5$ | inlet$C_7$ outlet$C_7$ | inlet$C_2$ outlet$C_1$ | inlet$C_4$ outlet$C_3$ |
| $T_4^8-T_5^3$ | inlet$C_6$ outlet$C_5$ | inlet$C_8$ outlet$C_7$ | inlet$C_2$ outlet$C_1$ | inlet$C_4$ outlet$C_3$ |

TABLE 4-continued

SEQUENCING OF CONSTANT CO-CURRENT RECYCLE

| T | Zone 1 | Zone 2 | Zone 3 | Zone 4 |
|---|---|---|---|---|
| $T_5^3-T_5^7$ | inlet$C_6$ outlet$C_5$ | inlet$C_8$ outlet$C_7$ | inlet$C_3$ outlet$C_1$ | inlet$C_4$ outlet$C_4$ |
| $T_5^7-T_5^5$ | inlet$C_7$ outlet$C_5$ | inlet$C_8$ outlet$C_8$ | inlet$C_3$ outlet$C_1$ | inlet$C_4$ outlet$C_4$ |
| $T_5^5-T_5^1$ | inlet$C_7$ outlet$C_6$ | inlet$C_8$ outlet$C_8$ | inlet$C_3$ outlet$C_3$ | inlet$C_5$ outlet$C_4$ |
| $T_5^1-T_6^4$ | inlet$C_7$ outlet$C_6$ | inlet$C_1$ outlet$C_8$ | inlet$C_3$ outlet$C_2$ | inlet$C_5$ outlet$C_4$ |
| $T_6^4-T_6^6$ | inlet$C_7$ outlet$C_6$ | inlet$C_1$ outlet$C_8$ | inlet$C_4$ outlet$C_2$ | inlet$C_5$ outlet$C_5$ |
| $T_6^6-T_6^8$ | inlet$C_8$ outlet$C_6$ | inlet$C_1$ outlet$C_1$ | inlet$C_4$ outlet$C_2$ | inlet$C_5$ outlet$C_5$ |
| $T_6^8-T_6^2$ | inlet$C_8$ outlet$C_7$ | inlet$C_1$ outlet$C_1$ | inlet$C_4$ outlet$C_2$ | inlet$C_6$ outlet$C_5$ |
| $T_6^2-T_7^5$ | inlet$C_8$ outlet$C_7$ | inlet$C_2$ outlet$C_1$ | inlet$C_4$ outlet$C_3$ | inlet$C_6$ outlet$C_5$ |
| $T_7^5-T_7^1$ | inlet$C_8$ outlet$C_7$ | inlet$C_2$ outlet$C_1$ | inlet$C_5$ outlet$C_3$ | inlet$C_6$ outlet$C_6$ |
| $T_7^1-T_7^7$ | inlet$C_1$ outlet$C_7$ | inlet$C_2$ outlet$C_2$ | inlet$C_5$ outlet$C_3$ | inlet$C_6$ outlet$C_6$ |
| $T_7^7-T_7^3$ | inlet$C_1$ outlet$C_8$ | inlet$C_2$ outlet$C_2$ | inlet$C_5$ outlet$C_3$ | inlet$C_7$ outlet$C_6$ |
| $T_7^3-8T$ | inlet$C_1$ outlet$C_8$ | inlet$C_3$ outlet$C_2$ | inlet$C_5$ outlet$C_4$ | inlet$C_7$ outlet$C_6$ |

In the case of a co-current simulated mobile bed with four zones and eight columns, calculation of the optimal $Q_c$ value is made by putting:

$$8.T = T_8^8 = T_8^6 = T_8^4 = T_8^2 \qquad (5)bis$$

The terms $T_{i+1}^j$ and T are thus eliminated to give an explicit equation in $Q_c$ and the root which is closest to $Q_M$ is selected.

For zones 1, 2, 3 and 4, the four series of equations identifying the eluted volumes at the outlet to the zone between the two types of simulated mobile bed can be derived.

For the four zones, one and the same explicit equation which is fourth degree in $Q_c$ can be derived. Working on the series of equations for zone 3 or zone 4, the following formula is directly derived:

$$8T(Q_4+S-Q_c)=RT_2^8-Ch\ T_4^8+ET_6^8$$

where:

$$T_2^8=2T.Q_4/Q_c$$

$$T_4^8=(4.T(Q_4+R)-RT_2^8)/Q_c$$

$$T_6^8=(6T.(Q_4+S-E)-RT_2^8+Ch\ T_4^8)/Q_c$$

which, after elimination of $T_{i+1}^j$ and T, produces $$4Q_c^4-4.(Q_4+S).Q_c^3+[Q_4(2S-R+E)-2\ ChR+3ES-3E^2]Q_c^2+ [Q_4(RCh+2ECh-RE)+2RECh]Q_c-R.E.Ch\ Q_4=0$$

In the more general case of four zones and n columns, if $C_K$ represents the number of columns in zone K, the formula is:

$$nT(Q_4+S-Qc)=RT_{c4}^{n-Ch}\ T_{c4+c3}^n+ET_{c4+c3+c2}^n$$

where:

$$T_{c4}^n=C_4T\ Q_4/Q_c$$

$$T_{c4+c3}^n=[(C_4+C_3)\ (Q_4+R)\ T-RT_{c4}^n]/Q_c$$

$$T_{c4+c3+c2}^n=[(C_4+C_3+C_2)\ (Q_4+S-E)T-RT_{c4}^n+Ch\ T_{c4+c3}^n]/Q_c$$

i.e., expressed explicitly in $Q_c$:

$$nQ_c^4-n.(Q_4+S).Q_c^3-[E.(n-C_1).(Q_4+S-E)-Ch(C_4+C_3)\ (Q_4+R)+ C_4RQ_4]Q_c^2+[C_4RQ_4(C_h-E)+ECh\ (C_4+C_3)\ (Q_4+R)]Q_c-C_4RECh\ Q_4=0$$

The invention will be better understood from the following purely illustrative examples.

EXAMPLE 1

This concerned a conventional counter-current simulated mobile bed with four zones each containing 2 sections with the following respective flow rates, in arbitrary units: S=2, E=1.5, Ch=1, R=1.5, Q1=8, Q2=6.5, Q3=7.5, Q4=6. The period was 100 seconds, the fourth degree equation became:

$$4Q_c^4 - 24Q_c^3 - 32.75Q_c^2 + 13.5Q_c + 18 = 0$$

The solution had to be close to $Q_M = Q_4 + (2S + R - E)/4 = 7$

The physical root gave $Q_c = 7.077$. This flow rate value was used for the recycling pump. This pump was in zone 4 up to $T_2^7$, in zone 3 up to $T_4^8$, in zone 2 up to $T_6^7$ and in zone 1 to the end of the cycle.

Table 5 below gives the shift times:

| | | | |
|---|---|---|---|
| $T_1^2 = 88,13$ s | $T_1^4 = 85,79$ s | $T_1^6 = 87,44$ s | $T_1^8 = 84,78$ s |
| $T_2^3 = 176,54$ | $T_2^5 = 171,57$ | $T_2^7 = 174,89$ | $T_2^1 = 169,56$ |
| $T_3^4 = 282,14$ | $T_3^6 = 277,72$ | $T_3^8 = 280,88$ | $T_3^2 = 275,73$ |
| $T_4^5 = 387,36$ | $T_4^7 = 384,68$ | $T_4^1 = 386,59$ | $T_4^3 = 383,31$ |
| $T_5^6 = 480,64$ | $T_5^8 = 476,53$ | $T_5^2 = 479,45$ | $T_5^4 = 474,75$ |
| $T_6^7 = 573,91$ | $T_6^1 = 568,37$ | $T_6^3 = 572,30$ | $T_6^5 = 565,97$ |
| $T_7^8 = 686,96$ | $T_7^2 = 683,44$ | $T_7^4 = 685,97$ | $T_7^6 = 681,82$ |
| $T_8^1 = 800$ | $T_8^3 = 800$ | $T_8^5 = 800$ | $T_8^7 = 800$ |

The eluted volumes per period were 800 in zone 1, 650 in zone 2, 750 in zone 3 and 600 in zone 4, whatever the shift period during the cycle.

It should be noted that the average flow rate weighted over the whole of the system was still equal to 7:

$$\frac{T_2^7(Q_c + 1) + (T_4^7 - T_2^7)(Q_c - 0.5) + (T_6^7 - T_4^7)(Q_c + 0.5) + (8T - T_6^7)(Q_c - 1)}{8T}$$

On the other hand, the average flow rates in each of the sections were not all identical. It should be noted that $T_1^2$, $T_1^4$, $T_1^6$ and $T_1^8$, or more generally the intervals with the same configuration, remained close to each other, and the maximum time was observed between $T_6^7$ and $T_6^{5}$, i.e., 8 seconds: the four circuits could thus be shifted at the same time without the eluted volumes ($VEZ_i$) expressed in arbitrary units being different by more than 2.2% to those expected (Table 6):

| | $VEZ_1$ | $VEZ_2$ | $VEZ_3$ | $VEZ_4$ |
|---|---|---|---|---|
| $T_1 = 86,53$ s | 786,46 | 655,64 | 742,17 | 612,37 |
| $T_2 = 173,14$ s | 786,16 | 656,24 | 742,85 | 612,94 |
| $T_3 = 279,11$ s | 802,93 | 643,98 | 749,95 | 590,99 |
| $T_4 = 385,48$ s | 805,97 | 646,41 | 752,28 | 593,23 |
| $T_5 = 477,83$ s | 792,09 | 653,56 | 745,91 | 607,39 |
| $T_6 = 570,13$ s | 791,66 | 653,21 | 745,51 | 607,06 |
| $T_7 = 684,53$ s | 809,61 | 638,01 | 752,41 | 580,81 |
| $T_8 = 800,00$ s | 817,04 | 643,86 | 759,31 | 586,14 |
| AVERAGE VALUES | 798,88 | 648,88 | 748,82 | 598,88 |

The times in Table 6 constituent the average row by row of the four values given in Table 5.

Since the average eluted volumes were slightly lower than the desired values, a minor correction could be made to $Q_c$ to re-establish the situation:

$$Q'_c = \frac{7.077 \times 700}{698.86} = 7.0885$$

The value of the constant recycle flow rate thus changed from 7.077 to 7.088.

In separations where very high purity is not required, such as glucose-fructose or normal-isoparaffins, this type of operating is suitable. A single valve controlling all the circuits at once can thus continue to be used in existing units.

We have carried out the separation at 60° C. of a 65% glucose—35% fructose solution containing 400 g/l of dry matter in the same unit loaded with a styrene-DVB cation exchange resin in its calcium form, such as DOWEX monosphere$^R$, with water as the eluent. In the case of a conventional simulated mobile bed, a purity of 97.65% was obtained for the glucose fraction and a purity of 98.05% was obtained for the fructose fraction.

In the preferred version of the invention, the purities obtained were respectively 97.85% and 99.20%. In the case of the simplified version of the invention where all the streams are simultaneously shifted, the purities obtained were 95.70% for the glucose fraction and 96.15% for the fructose fraction. In both cases of application of the invention, the times indicated were rounded to the closest 1/10th of a second.

EXAMPLE 2

This concerned a conventional co-current simulated mobile bed with four zones each of two sections with the following respective flow rates in arbitrary units: S=2.8, E=1.4, Ch=1.75, R=3.15, Q1=5.95, Q2=7.35, Q3=5.6, Q4=8.75. (Using our convention, we should note that Q1=−5.95, Q2=−7.35, Q3=−5.6, Q4=−8.75). The period was 100 seconds.

The fourth degree equation became:

$$4Q_c^4 + 23.8Q_c^3 - 38.8325Q_c^2 - 37.086875Q_c + 67.528125 = 0$$

The solution had to be close to $$Q_M = Q_4 + \frac{(2S + R - E)}{4} = -6.9125$$

The physical root was $Q_c = -7.08773$. This flow rate was used for the recycling pump. The period matrix was thus as follows (Table 7):

| | | | |
|---|---|---|---|
| $T_1^1 = 138,77$ s | $T_1^3 = 129,23$ s | $T_1^5 = 142,21$ s | $T_1^7 = 123,45$ s |
| $T_2^2 = 264,56$ | $T_2^4 = 254,34$ | $T_2^6 = 267,75$ | $T_2^8 = 246,91$ |
| $T_3^3 = 344,56$ | $T_3^5 = 337,50$ | $T_3^7 = 346,76$ | $T_3^1 = 332,37$ |
| $T_4^4 = 424,56$ | $T_4^6 = 420,67$ | $T_4^8 = 425,77$ | $T_4^2 = 417,84$ |
| $T_5^5 = 528,80$ | $T_5^7 = 523,11$ | $T_5^1 = 530,68$ | $T_5^3 = 519,30$ |
| $T_6^6 = 632,10$ | $T_6^8 = 626,81$ | $T_6^2 = 633,77$ | $T_6^4 = 622,39$ |
| $T_7^7 = 716,05$ | $T_7^1 = 713,40$ | $T_7^3 = 716,89$ | $T_7^5 = 711,51$ |
| $T_8^8 = 800$ | $T_8^2 = 800$ | $T_8^4 = 800$ | $T_8^6 = 800$ |

The eluted volumes per period were 595 in zone 1, 735 in zone 2, 560 in zone 3 and 875 in zone 4.

Using the same unit as that of Example 1, the same feed was separated using the same solvent (water), this time operating in simulated co-current mode. (Mechanically, it was sufficient to reverse the output and intake connections of the recycling pump: it should be noted that between Example 1 and Example 2, the feed flow rate was multiplied by 1.75 while the constant recycle flow rate remained substantially the same in absolute values). The purities obtained were respectively 92.50% for the glucose fraction and 92.95% for the fructose fraction.

It can be seen that in Example 1, the largest of the inlet-outlet flow rates was three times smaller than the recycle flow rates, meaning that the relative maximum observed interval for the $p^{th}$ shift in different circuits is $(T_2^3-T_2^1)/T_2^3$, i.e., 3.95%, and that for separations where a lower purity would suffice, it was possible to shift the four circuits simultaneously. In Example 2, the lowest recycle flow rate was not even twice as high as the highest inlet-outlet flow rate: this meant that the maximum relative interval observed for the $p^{th}$ circuit shift was $(T_2^8-T_2^6)/T_2^6$, i.e., 7.9%. As a consequence, if the four valves are shifted at the same time, it would be completely impossible to obtain purities of higher than 90%, which is unacceptable for commercial separation. The version of the invention involving simultaneous shifts is thus only applicable to simulated co-current mode when the ratio $Q_M/Ch$ is greater than 6. Operating in simulated co-current mode under these conditions would lose the advantage of this process over a simulated counter-current process.

We claim:

1. A simulated moving bed separation process for a feed comprising at least 2 constituents in the presence of at least one solvent, in an apparatus containing n chromatographic column sections in a closed loop each capable of operating within z zones, z being at least 4, a recycling pump for a mixture of the solvent and constituents located between the nth and first sections and being operated in each zone successively during the course of one cycle, each of the n column sections including an introduction (inlet) or extraction (outlet) point corresponding to each zone such that there are a total of z-n introduction and extraction points, wherein the recycling pump circulates said mixture at a recycle flow rate $Q_c$ which is substantially constant during the cycle, said flow rate $Q_c$ being greater than all other flow rates introduced or extracted to/from the apparatus, and all the introduction and extraction points are shifted throughout the cycle using independent means at least two introduction and extraction points being shifted at different times, such that the eluted volume at the outlet to each zone is substantially constant, zone by zone, between two successive shifts throughout the cycle.

2. A process according to claim 1, wherein each shifting of introduction/extraction points is done independently throughout the cycle in its own time sequence, after a time interval $(T_{i+1}^j-T_i^{j-1})$ which is defined by the relation:

$$0.975\ T.Qk<(T_{i+1}^j-T_i^{j-1}).Q_k^P<1.025\ T.Q_k$$

wherein j is the number of the section immediately preceding the introduction or extraction point; i is the number of times which the slowest extraction point or introduction point has already been shifted since the beginning of the cycle, T, $Q_k$ and $Q_k^P$ respectively represent the constant time interval of an equivalent simulated moving bed having a non-constant recycle flow rate during the cycle, the constant flow rate in zone k of said equivalent simulated moving bed and the flow rate in zone k of the constant recycle simulated moving bed when the pump is in zone p.

3. A process according to claim 2, wherein the constant recycle flow rate is between the highest recycle flow rate of said equivalent simulated moving bed and the highest of the values of the lowest of the recycle flow rates of said equivalent simulated moving bed and the highest of the other flow rates.

4. A process according to claim 2, wherein the constant recycle flow rate is between the highest recycle flow rate of said equivalent simulated moving bed and the highest of the values of the lowest of the recycle flow rates of said equivalent simulated moving bed and the highest of the other flow rates.

5. A process according to claim 2, wherein the constant recycle flow rate $Q_c$ is substantially equal to the weighted average flow rate $Q_M$ of said equivalent simulated moving bed.

6. A process according to claim 2, wherein the constant recycle flow rate $Q_c$ is substantially equal to the weighted average flow rate $Q_M$ of said equivalent simulated moving bed.

7. The process of claim 2, wherein the relation is:

$$0.9975\ T.Qk<(T_{i+1}^j-T_i^{j-1}).Q_k^P<1.025\ T.Q_k.$$

8. A process according to claim 1, wherein the constant recycle flow rate is between the highest recycle flow rate of an equivalent simulated moving bed having a non-constant recycle flow rate during the cycle and the highest of the values of the lowest of the recycle flow rates of the equivalent simulated moving bed and the highest of the other flow rates.

9. A process according to claim 1, wherein the constant recycle flow rate $Q_c$ is substantially equal to the weighted average flow rate $Q_M$ of an equivalent simulated moving bed having a non-constant recycle flow rate during the cycle.

10. A process according to claim 1, wherein the simulated moving bed is operated in counter-current mode.

11. A process according to claim 1, wherein the simulated moving bed is operated in co-current mode.

* * * * *